United States Patent [19]
Hart et al.

[11] 3,722,664
[45] Mar. 27, 1973

[54] ARTICULATED PUSHER CONVEYOR CHAIN

[75] Inventors: Harold W. Hart; Edward A. Southworth, both of Glendale, Calif.

[73] Assignee: H. W. Hart Mfg. Co., Glendale, Calif.

[22] Filed: Apr. 30, 1971

[21] Appl. No.: 138,893

[52] U.S. Cl..................................198/168, 417/320
[51] Int. Cl..............................................B65g 19/00
[58] Field of Search......198/168, 171, 172, 175, 176; 417/320

[56] References Cited

UNITED STATES PATENTS 2,762,495  9/1956  Hart.....................................198/176
2,125,897  8/1938  Dupont............................198/168 X

*Primary Examiner*—Evon C. Blunk
*Assistant Examiner*—H. S. Lane
*Attorney*—Smyth, Roston & Pavitt

[57] ABSTRACT

The chain consists of pushers interconnected by links, each pusher comprising a pair of spaced coaxial disks interconnected both by spaced webs and spaced U-shaped clips, the two disks confining socket washers that engage enlarged heads of the corresponding links. The U-shaped clips both straddle and space apart the two disks and the U-shaped clips as well as the two webs space apart the two socket washers and at the same time cooperate with the two disks to captivate the two washers.

19 Claims, 10 Drawing Figures

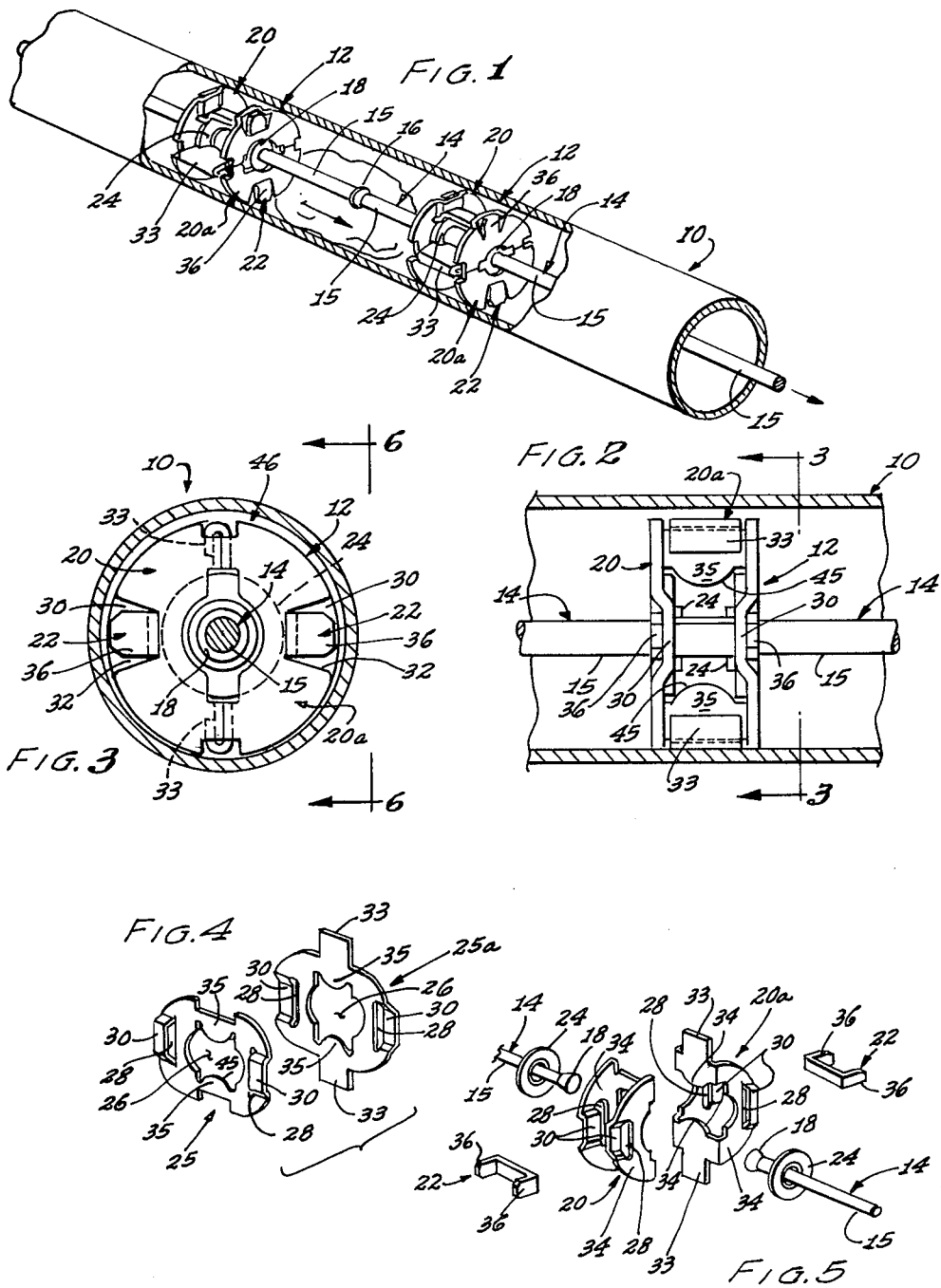

3,722,664

ARTICULATED PUSHER CONVEYOR CHAIN

BACKGROUND OF THE INVENTION

The invention relates to a conveyor of the character disclosed in the Hart U.S. Pat. No. 2,762,495 which is widely used for conveying feed to fowls in commercial egg production. Such a conveyor consists of a line of tubing forming a conveyor passage through which granular feed is moved by an articulated pusher conveyor chain. The conveyor chain comprises spaced circular pushers that conform to the configuration of the surrounding tubing and that are flexibly interconnected by axial links.

In the Hart patent each pusher comprises two spaced coaxial disks interconnected at four equally spaced points, two of the interconnections being webs integral with the two disks and the other two interconnections being U-shaped clips that are interposed between the two disks. The four spaced interconnections complete a cage to confine a pair of socket washers adjacent the inner faces respectively of the two disks and the socket washers, in turn, flexibly engage enlarged ends of the corresponding axial links of the chain.

Because the continuous loop of pusher chain employed in a typical feed conveyor system may be hundreds of feet long, with each pusher not only pushing against the granular feed but also encountering frictional resistance, the conveyor chain is placed under relatively high tension and since each pusher is, in effect, a link in the chain, the tension load is applied across each pusher and thus tends to pull each pusher apart. In addition each pusher tends to be distorted by relatively high non-axial stresses in the region of each change of direction of the conveyor.

In many instances of structural failure of such a conveyor chain, the failure occurs at the spot welding that bonds the U-shaped clips to the inner surfaces of the two spaced disks of a pusher. Underlying the present invention is the discovery that one cause of structural failure is that the socket washers which carry the full load that is imposed on the conveyor chain may function in some instances as wedges acting between the U-shaped clips and the inner surfaces of the pusher disks to pry the U-shaped clips loose at the spot-welded joints. It has been further discovered that the frequency of the destructive wedging action is encouraged by the freedom of the socket washers to change positions inside the pusher structure.

It is also to be noted that the necessity of making six spot welds in the fabrication of each pusher accounts for a major portion of the fabrication cost. There is need, therefore, for a cheaper method of interconnecting the parts of the pusher.

SUMMARY OF THE INVENTION

The problem of avoiding failures of the pushers is solved in large part by providing a new structural relationship between the U-shaped clips and the two spaced disks of a pusher. In the old construction the U-shaped clips are merely inserted between the two spaced disks in the manner of spacers with the arms of the clips spot welded to the inner faces of the disks so that placing a load across the pusher tends to rupture the spot welding. In the new construction the U-shaped clips straddle the two disks.

By virtue of the straddling relationship, each clip confines the two disks in a positive manner and, in effect, transmits loads around the two disks instead of merely transmitting the load from the inner surface of one disk to the inner surface of the other disk. Thus the load across a pusher tends to press the two spaced disks against the arms of the U-shaped clips instead of tending to pull the two disks away from the U-shaped clip.

An important feature of the invention is the concept of mechanically interlocking the straddling U-shaped clips with the pairs of disks for positive retention of the U-shaped clips in their assembled positions. The interlock is accomplished in part by extending the U-shaped clips through apertures in the two disks respectively and in further part by deforming the two disks to create recesses therein for the arms of the clips. The recesses confine the arms of the U-shaped clips and at the same time place the arms of the clip in the planes of the two disks to avoid increasing the overall axial dimension of the pusher. The straddling relationship together with the interlocking relationship makes it possible to eliminate spot welding between the clips and the disks as wholly unnecessary. Thus four of the six spot welds are eliminated.

In the old construction the U-shaped clips act as positive spacers between the pairs of spaced disks. In this regard a further feature of the invention is the concept of deforming the straddling U-shaped clips in such manner that the U-shaped clips serve as spacers between the disks.

As will be explained, the invention also makes provision for more effectively captivating the two socket washers of a pusher to make sure that the socket washers are maintained in the desired assembled positions relative to the disks and relative to the U-shaped clips.

In both the old construction and the new construction of the present invention, each pusher comprises largely a pair of semi-circular sheet metal members of U-shaped cross-sectional configuration that are united in mutual abutment. In the old construction two of the six spot welds hold the two sheet metal members together but in the new construction the two sheet metal members are simply mechanically interlocked. Thus the new construction eliminates all six of the spot welds and in doing so makes it possible to assemble a pusher chain largely if not entirely by automatic machinery.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a perspective view, partly broken away, showing a portion of a conveyor that incorporates the presently preferred embodiment of the articulated conveyor chain;

FIG. 2 is an enlarged fragmentary view showing the conveyor tube in section and showing a portion of the conveyor in side elevation;

FIG. 3 is a transverse section taken as indicated by the line 3 — 3 of FIG. 2, the view showing a pusher in front elevation;

FIG. 4 is a perspective view of a pair of sheet metal blanks which are subsequently bent to U-shaped configuration for the purpose of assemblying a pusher;

FIG. 5 is a perspective exploded view of the parts of a pusher;

DESCRIPTION OF THE PREFERRED EMBODIMENT OF THE INVENTION

Figure 6:
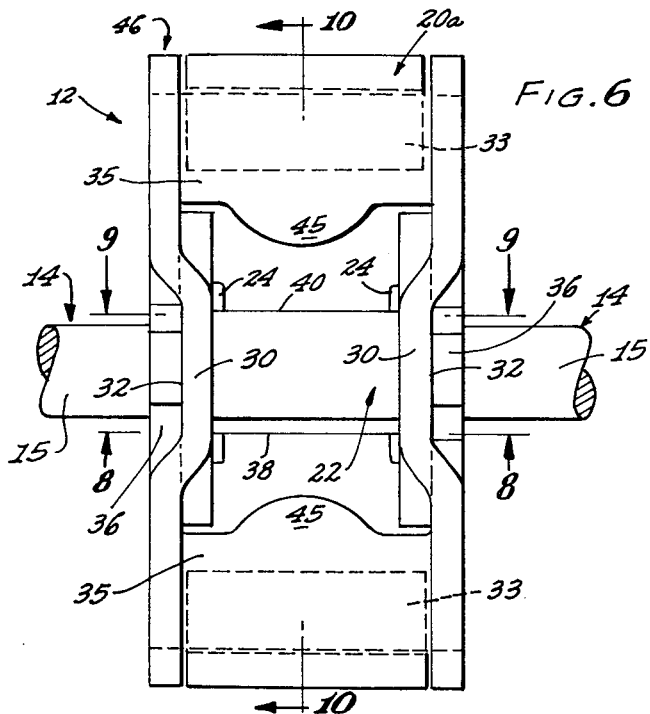
FIG. 6 is a greatly enlarged side elevation of a pusher as seen along the line 6 — 6 of FIG. 3.
Figure 7:
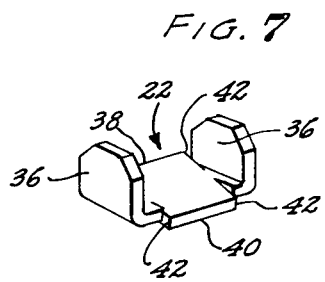
FIG. 7 is a perspective view on a smaller scale showing how the central portion of a U-shaped clip is lanced and distorted for the dual purpose of serving as spacer means between the two spaced disks and of serving as spacer means between the two socket washers of a pusher.

In FIG. 1 illustrating the presently preferred practice of the invention, the conveyor for moving granular chicken feed comprises a tube, generally designated 10, and a conveyor chain which consists of successive pushers, generally designated 12, flexibly interconnected by axially extending links 14. Each link 14 comprises a pair of short rods 15 joined end-to-end by butt welding 16, each of the short rods having a head or enlargement 18 on one end as best shown in FIG. 5.

The essential parts of a pusher 12, which are best illustrated in FIG. 5, comprise a pair of semi-circular sheet metal members 20 and 20a of U-shaped cross-sectional configuration, a pair of U-shaped clips 22 and a pair of socket washers 24 which receive corresponding short rods 15 and flexibly captivate the enlargements 18 on the inner ends of the short rods.

FIG. 4 shows a pair of sheet metal blanks 25 and 25a which are subsequently bent to U-shaped cross-sectional configuration to form the semi-circular members 20. Each sheet metal blank 25 and 25a has a relatively large central opening 26 and is further provided with a pair of diametrically opposite slots 28 to receive the central portions of the U-shaped clips 22. Each of the sheet metal blanks 25 and 25a is further formed with an offset portion 30 which forms a radial recess 32 to seat an arm of a U-shaped clip. It is to be noted that a sheet metal blank 25a is similar to a sheet metal blank 25 but is formed with a pair of opposite tongues 33 that a sheet metal blank 25 does not have. As may be seen in FIG. 5, each of the two semi-circular members 20 and 20a is of U-shaped cross-sectional configuration to provide a pair of spaced parallel semi-circular wings 34 with the two wings interconnected by two spaced integral coplanar webs 35. It can be further seen that a semi-circular member 25a differs from a semi-circular member 25 in that it has the pair of previously mentioned opposite tongues 33.

In the procedure of assembling a pusher 12, the two clips 22 are initially in the form of straight blanks, the blanks being subsequently bent to form the arms 36 of the clip. The straight blanks for the clips 22 are inserted into the slots 28 of the semi-circular sheet metal members 20 and 20a and then the opposite ends of the clip blanks are bent to form the parallel arms 36 with the arms firmly seated in the corresponding radial recesses 32.

Figure 8:
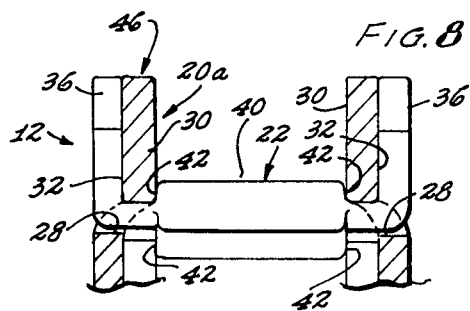
FIG. 8 is a fragmentary sectional view along the line 8 — 8 of FIG. 6 showing the configuration of a completed U-shaped clip.
Figure 9:
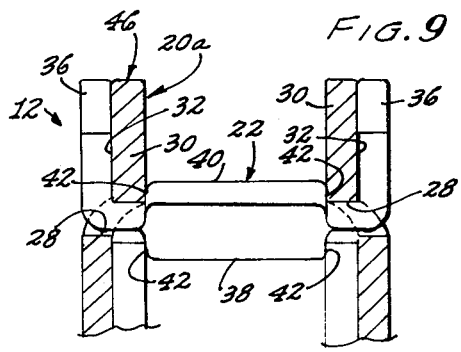
FIG. 9 is a similar sectional view taken along the line 9 — 9 of FIG. 6 showing the same U-shaped clip as viewed from the opposite side.
Figure 10:
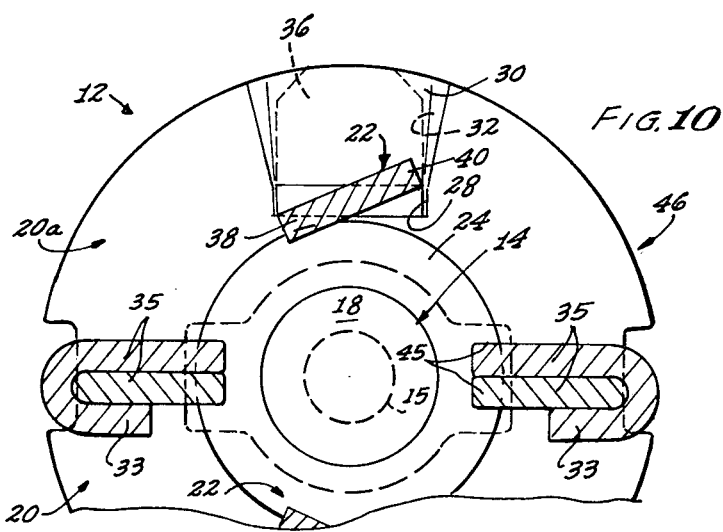
FIG. 10 is a greatly enlarged fragmentary section taken as indicated by the line 10 — 10 of FIG. 6 showing how the central portion of a U-shaped clip is lanced and distorted to serve the purpose of the invention.

The next step is to lance and distort the central portion of each sheet metal clip 22 to result in the final configuration of a U-shaped clip that is shown in FIGS. 7 – 10. As may be seen in FIG. 7, the material of the central portion of a U-shaped clip is lanced at two spaced points to form a tongue 38. In the same operation the lanced central portion of the U-shaped clip is deformed in the manner shown in FIGS. 7 and 10 to cause the tongue 38 to incline radially inwardly of the semi-circular sheet metal member, the inclination being best shown in FIG. 10. The deformation of the central portion of the U-shaped clip causes a portion 40 of the clip to protrude radially outwardly between the two wings 34 of the semi-circular sheet metal member to function as a spacer between the two wings. Thus, as shown in FIG. 8 the outwardly protruding portion 40 of the central portion of each clip 22 forms two shoulders 42 in firm abutment against the inner surfaces of the two wings 34 respectively.

The next step is to insert two short rods 15 into two socket washers 24 in the manner shown in FIG. 5 and then to position the two socket washers inside the central openings of a pair of semi-circular sheet metal members 20 and 20a. The two semi-circular sheet metal members 20 and 20a are brought together with their webs 35 positioned back-to-back and then the two semi-circular sheet metal members 20 are united by bending the two tongues 33 of the semi-circular sheet metal member 20a over the corresponding webs 35 of the semi-circular sheet metal member 25.

As shown in FIGS. 2 and 6, each of the two webs 35 of a semi-circular sheet metal member 20 is extended slightly radially inwardly to form a curved lip 45. As best shown in FIG. 6 the two lips 45 extend radially inwardly into the region between the two socket washers 24 and thus serve as means to space the two socket washers apart. The previously mentioned inwardly inclined tongues 38 of the U-shaped clips 22 also extend into the region between the two socket washers 24 to space the two socket washers apart. Thus at four points spaced 90° apart around the two socket washers 24, the socket washers are peripherally engaged to captivate them against the inner surfaces of the two disks 46 that are formed by the assembled semi-circular sheet metal members 20.

After a number of pushers 12 have been fabricated in this manner with short rods 15 extending in opposite axial directions from each pusher, the pushers are assembled into a chain by uniting confronting ends of the short rods 15 end-to-end by butt welding.

Our description in specific detail of the presently preferred embodiment of the invention will suggest various changes, substitutions and other departures from our disclosure within the spirit and scope of the appended claims.

We claim:

1. An articulated conveyor chain for pushing material through a conveyor passage, including, a plurality of spaced pushers each pusher including two members of sheet material in paired relationship, each member being of U-shaped cross section forming a pair of wings and with the wings interconnected by a pair of integral webs, the webs of the two members being disposed in contiguous back-to-back relationship whereby the pairs of wings of the two united members form two coaxial pusher disks interconnected by the webs, a plurality of U-shaped clips, each clip interconnecting a pair of the members of sheet material, each of said U-shaped clips straddling at least portions of the corresponding pair of wings and having portions disposed relative to the pair of members to reinforce the wings of the members against spreading away from each other, a plurality of rods each shaped at one end to be retained by the disk defined by the members in a pair at a position adjacent to one of the disks, and a plurality of washers each disposed between the disks defined by one of the members in a pair and cooperating with an associated rod to retain the end of the rod between the disks at a position adjacent to one of the disks.

2. A conveyor chain as set forth in claim 1 in which the U-shaped webs are mechanically interlocked with the pair of wings to maintain the U-shaped clips in their assembled positions in a positive manner and to retain the members in contiguous relationship to each other.

3. A conveyor chain as set forth in claim 2 in which portions of the U-shaped clips extend between the two wings of each member to serve as positive means to space apart the two disks defined by the two united members.

4. A conveyor chain as set forth in claim 3 in which there are apertures in the wings and in which each of the U-shaped clips has two arms interconnected by a central portion of the clip, the central portion of the clip extending through the apertures in the wings with the arms of the clip positioned on the outer sides of the wings and extending radially of the wings to retain the wings against axial movement outwardly.

5. A conveyor chain as set forth in claim 4 in which the portions of the wings that are engaged by the arms of a clip are offset towards each other with the outer surfaces of the arms of the clip substantially flush with the outer surfaces of the remaining portions of the wings.

6. A conveyor chain as set forth in claim 4 in which the central portions of the clips are distorted to form shoulders abutting the inner surfaces of the corresponding pair of wings whereby the central portions of the clips serve as spacers between the two wings.

7. A conveyor chain as set forth in claim 6 wherein the web on one of the members has a tongue which engages the other member to retain the pair of members with their webs in contiguous back-to-back relationship.

8. A conveyor chain as set forth in claim 7 wherein the webs on the pair of members are shaped at their inward positions to space the washers retained by each of the disks defined by the pair of members.

9. An articulated conveyor chain for pushing material through a conveyor passage, including, a plurality of pushers, each pusher including two members of sheet material, each member being of U-shaped cross section forming a pair of wings and with the wings interconnected by integral webs, the webs of the two members being disposed in contiguous back-to-back relationship whereby the pairs of wings of the two united members define two coaxial pusher disks interconnected by the webs, a plurality of spaced washers, pairs of the spaced washers in the plurality being disposed respectively adjacent the inner surfaces of the two disks, a plurality of rods having heads at their opposite ends, the heads being captivated by the washers between the disks defined by the pairs of members, and a plurality of U-shaped clips having central portions forming shoulders and having peripheral portions disposed against the wings to confine the wings.

10. A conveyor chain as set forth in claim 9 wherein the U-shaped clips have central portions extending along the webs of associated members and have arms at the ends of the clips in transverse relationship to the central portions and wherein the arms engage the associated members to retain the washers and the heads of the rods between the pairs of disks defined by the pairs of members.

11. A conveyor chain as set forth in claim 10 in which the central portion of each clip has two spaced slits forming a tongue and the tongue extends between the two socket washers to space the two socket washers apart and to confine the two socket washers adjacent the corresponding disks defined by the pairs of members.

12. A conveyor chain as set forth in claim 10 in which the spaced webs disposed in contiguous back-to-back relationship extend radially inwardly of the pusher into the region of the two socket washers confined between the pairs of disks to serve as spacers between the socket washers and to confine the two socket washers adjacent the two disks in the pair.

13. A conveyor chain as set forth in claim 12 in which portions of the clips also extend radially inwardly of the associated pushers into the region of the two socket washers to serve as spacers between the two socket washers and to confine the two socket washers adjacent the two disks in the pair.

14. A conveyor chain as set forth in claim 13 in which the spacers formed by the bonded webs for the socket washers and the spacers formed by the clips for the socket washers have spacings of approximately 90° around an annular periphery.

15. A conveyor chain as set forth in claim 12 wherein the members have slots for receiving the central portions of the associated clips and have recesses adjacent the slots for seating the arms at the ends of the clips.

16. A conveyor chain as set forth in claim 13 wherein the web on one of the two members in each pair has a tongue which mechanically embraces the web of the other member in the pair to retain the members with their webs in contiguous back-to-back relationship.

17. A conveyor chain as set forth in claim 16 in which the tongue on the one of the two members in each pair is flexible and is bent into engagement with the web on the other member in the pair.

18. A conveyor chain as set forth in claim 17 in which said one member is formed in its web with two opposite flexible tongues both of which are folded into engagement with the web on the other of the two members.

19. A conveyor chain as set forth in claim 16 wherein the members have slots for receiving the central portions of the associated clips and have recesses adjacent the slots for seating the arms at the ends of the clips and the central portion of each clip has two spaced slots forming a tongue and the tongue on each clip extends between the two associated socket washers to space the two socket washers apart and to confine the two socket washers adjacent the corresponding disks defined by the pairs of members.

* * * * *